United States Patent [19]
Schrader

[11] 3,871,064

[45] Mar. 18, 1975

[54] MOIRE FRINGE PATTERN WITH THERMAL MATCHING TO ALUMINUM OR OTHER MATERIALS

[75] Inventor: George Frederick Schrader, Lakewood, Calif.

[73] Assignee: Control Data Corporation, Minneapolis, Minn.

[22] Filed: Mar. 25, 1974

[21] Appl. No.: 454,351

[52] U.S. Cl. .................... 29/475, 156/163, 156/252, 156/257, 156/263, 350/320

[51] Int. Cl. ........................................... G02b 27/00

[58] Field of Search ...... 29/475; 156/163, 252, 257, 156/263; 350/162 R, 320; 250/237 R, 237 G; 264/1, 2

[56] References Cited

UNITED STATES PATENTS

| | | | |
|---|---|---|---|
| 818,966 | 4/1906 | Ives | 350/162 R |
| 1,744,642 | 1/1930 | Kondo | 350/162 R |
| 2,232,551 | 2/1941 | Merton | 264/1 |
| 3,542,453 | 11/1970 | Kantor | 264/1 |
| 3,585,121 | 6/1971 | Franks et al. | 264/1 |
| 3,600,588 | 8/1971 | Sayce | 250/237 R |

*Primary Examiner*—Al Lawrence Smith
*Assistant Examiner*—Robert C. Watson
*Attorney, Agent, or Firm*—Edward L. Schwarz

[57] ABSTRACT

A method for manufacturing an optical grating which has a preselected coefficient of thermal expansion. The method comprises steps for easily and accurately affixing grating bars spanning a slot in a plate having the desired coefficient of thermal expansion.

5 Claims, 3 Drawing Figures

MOIRE FRINGE PATTERN WITH THERMAL MATCHING TO ALUMINUM OR OTHER MATERIALS

BACKGROUND OF THE INVENTION

1. Field of the Invention

In certain high-precision electro-mechanical positioning problems, the positioning is accomplished with reference to an optical grating having slits formed by bars spaced at intervals which correspond to the distance between adjacent stations at which the apparatus is to be positioned. Unfortunately, thermally-induced dimensional variations in the grating cause these individual stations to shift with respect to the reference point on the grating frame position. In such a case, even though the errors are on the order of millionths of an inch, it is necessary to compensate the positioning apparatus to cause the positioned apparatus to attain the desired positions. The problem arises, e.g. in the positioning of a transducing head adjacent the data tracks on a disc in a disc memory system. In a common implementation, the disc is made of aluminum, so if the frame of the optical grating is made of aluminum as well, compensation can be made to occur automatically. U.S. Pat. No. 3,720,930, having a common assignee with this application, discloses typical apparatus in which such a position sensor may be advantageously used.

2. Description of the Prior Art

The straightforward method of forming the desired bars by machining is a laborious and expensive task. For the necessary structural rigidity, it is necessary to have a relatively thick frame, and therefore to allow machining of the slits, an area must be thinned with a relatively deep machining operation, which must be done with reasonable accuracy, and hence is relatively expensive.

Attempts have beem made to create the grating pattern on thin glass sheets and then bond the glass to a substrate having the required coefficient of thermal expansion. This approach has been unsuccessful because the low coefficient of thermal expansion for glass resulted in breaking of the glass sheets.

SUMMARY OF THE INVENTION

There are four major steps in the method of this invention. A suitable frame is made from a plate having the desired coefficient of thermal expansion, by piercing the plate with a slot over which the grating bars are then placed. The actual grating bars themselves are formed in a thin sheet of a stronger material, whose periphery forms a temporary support for the bars. One flat surface of the sheet is then bonded to the frame in a position such that the bars extend across the slot in the plate with their ends attached by the bonding material to the area of the plate surrounding the slot. The area of the thin sheet external to the bars is then removed by mechanical or chemical milling, leaving the bars stretched across the slot in the plate and forming between themselves the slits of the grating.

Accordingly, one object of this invention is to form an optical grating having the coefficient of thermal expansion of any particular material.

Another object is to provide a method allowing such a grating to be formed inexpensively and with great accuracy.

Still another object of the invention is to provide such a grating having little or no parallax error.

Another object is to provide a grating whose bars have relatively great mechanical strength in comparison to their thickness.

Still another object is to provide a grating of the type described from which limit and dust may be easily removed without damage to the grating itself.

DESCRIPTION OF THE PREFERRED EMBODIMENT

Figure 1:
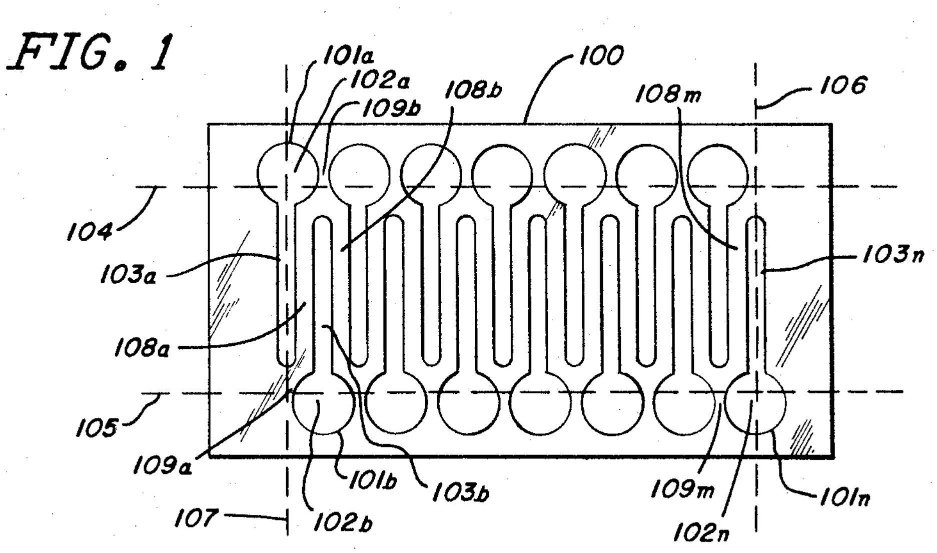
FIG. 1 is a plan view of a thin sheet in which a preferred set of slits defining the desired optical grating has been formed.

Turning first to FIG. 1, therein is shown flat thin sheet 100, which may be formed of any relatively strong machinable material, such as stainless or other steel. A plurality of openings generally designated by numerals 101*a*–101*n* are shown therein. It should be understood that hundreds of openings may be present when necessary. Each opening 101*a* –101*n* has a slit portion 103a-103n, which has a width equal to the desired slit width of the grating desired, and is typically a few thousandths of an inch. Each opening 101*a*–101*n* also has an enlarged area 102*a*–102*n*, each of which is located on the end opposite that end of adjacent slit(s) 103*a*–103*n* at which its enlarged area is located. Enlarged areas 102*a*–102*n* are selected such that they extend reasonably close to, but do not touch the adjacent enlarged area(s) on the same end of slit(s) 103*a*–103*n* involved. The space between the adjacent enlargements define supporting webs 109*a*–*m* which maintain the spacing of bars 108 *a*–m precisely with respect to each other. Dotted lines 104–107 define between them the actual grating portion of sheet 100.

Figures 2, 3:
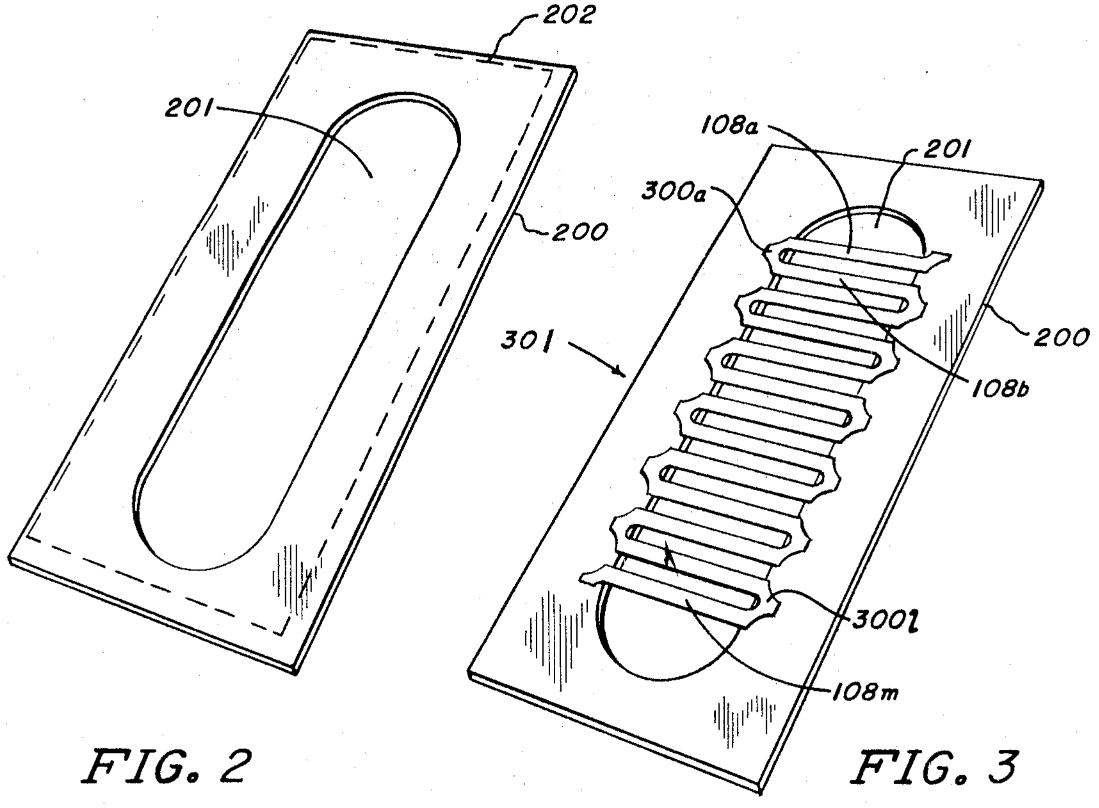
FIG. 2 is a perspective view of a grating frame having the slot over which the grating bars are placed, and formed of material having the desired coefficient of expansion.
FIG. 3 is a perspective view of the sheet shown in FIG. 1 attached to a flat surface of the frame in FIG. 2, with excess sheet material removed.

Plate or frame 200 in FIG. 2 furnishes a strong rigid frame for bars 108a-m forming a part of sheet 100. Plate 200 must be fabricated either from the material whose thermal expansion characteristics are to be duplicated by the grating, or from one whose characteristics are similar. Slot 201 may be of any desired shape and is for the purpose of allowing light to pass through slits 103*a*–*n*. Slot 201 pierces plate 200 and has sides which are spaced apart by less than the spacing between dotted lines 104 and 105 shown on sheet 100 in FIG. 1. Dotted line rectangle 202 has dimensions approximately that of sheet 100 and defines the approximate location occupied by sheet 100 when its bars 108a-m are correctly located with respect to slot 201.

After sheet 100 and frame 200 have been fabricated, sheet 100 is bonded to frame 200 in a position generally indicated by dotted line rectangle 202. This bonding can be done in a variety of ways, but I prefer that a relatively high strength, flexible epoxy cement be used. It is important that each end of each bar 108*a*–*m* overlap one side of frame 200, and be securely attached thereto with the bonding material. After the bonding material has thoroughly hardened, the areas (FIG. 1) of sheet 100 above and below horizontal dashed lines 104 and 105 respectively, and to the left and right respectively of lines 107 and 106 may be removed. This can be done by mechanical machining, chemical milling or other convenient techniques, resulting in a final product approximating that shown in FIG. 3, where each parallel bar 108*a*–108*n* is connected to one of the adjacent bars at one end and the other adjacent bar at the other end, thereby forming a continuous "zig-zag" or serpentine grid element. It is preferred that connecting loops 300*a*–300L be left on grating 300 to provide additional area for bonding. It has also been found desirable to maintain sheet 100 at somewhat above the temperature of plate or frame 200 during the bonding step until the bonding material has gained some load-bearing ability. This assures that bars 108*a*–108*n* will have a slight tension on them at room temperature, and hence will not buckle or sag during temperature variations through which grating 301 may pass during actual usage.

Having thus described my invention, what I claim is:

1. A method for forming an optical grating having the thermal expansion characteristics of a preselected material, comprising the steps of a. forming a plate of the preselected material having a flat surface with a slot having first and second sides piercing the plate;

b. forming a thin flat sheet of a material suitable for forming the bars of the grating;

c. forming slits creating therebetween in the thin flat sheet bars which form the desired grating and which are longer than the distance between the first and seconds sides of the slot but do not extend to the edge of the sheet;

d. bonding the sheet to the plate in a position causing each slit in the sheet to extend past the first and second sides of the slot in the plate; and e. removing portions of the sheet connections each end of each bar from an end of at least one adjacent bar.

2. The method of claim 1, wherein the step of forming slots in the sheet comprises the steps of forming substantially side by side slots each having a first parallel-sided area of predetermined width between its parallel sides, and at alternating ends of adjacent slots a second area wider than the predetermined width, and spaced apart from adjacent widened areas.

3. The method of claim 2, wherein the step of removing portions of the sheet comprises the step of removing those areas of the sheet between adjacent second areas of the slots and removing areas disconnected from the bars by the previous step.

4. The method of claim 1, further comprising the step of maintaining temperature of the sheet above the temperature of the plate during at least a part of the bonding step.

5. The method of claim 1, wherein the plate-forming step comprises forming the plate from aluminum, and the sheet-forming step comprises forming the sheet from steel.

* * * * *